United States Patent
Guizilini et al.

(10) Patent No.: US 11,704,822 B2
(45) Date of Patent: *Jul. 18, 2023

(54) SYSTEMS AND METHODS FOR MULTI-CAMERA MODELING WITH NEURAL CAMERA NETWORKS

(71) Applicant: TOYOTA RESEARCH INSTITUTE, INC., Los Altos, CA (US)

(72) Inventors: Vitor Guizilini, Santa Clara, CA (US); Igor Vasiljevic, Los Altos, CA (US); Rares A. Ambrus, San Francisco, CA (US); Adrien Gaidon, Los Altos, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/575,129

(22) Filed: Jan. 13, 2022

(65) Prior Publication Data
US 2022/0138975 A1 May 5, 2022

Related U.S. Application Data

(63) Continuation of application No. 17/021,940, filed on Sep. 15, 2020, now Pat. No. 11,321,862.

(51) Int. Cl.
*G06T 7/55* (2017.01)
*G06T 7/30* (2017.01)
(Continued)

(52) U.S. Cl.
CPC .............. *G06T 7/55* (2017.01); *G06T 3/0093* (2013.01); *G06T 7/30* (2017.01); *G05D 1/0214* (2013.01); *G05D 1/0223* (2013.01); *G05D 1/0251* (2013.01); *G05D 2201/0213* (2013.01); *G06T 2207/20081* (2013.01);
(Continued)

(58) Field of Classification Search
CPC ........... G06T 7/55; G06T 3/0093; G06T 7/30; G06T 2207/20084; G06T 2207/20081; G06T 2207/20221; G06T 2207/30252; G05D 2201/0213; G05D 1/0214; G05D 1/0223; G05D 1/0251
See application file for complete search history.

(56) References Cited

U.S. PATENT DOCUMENTS 10,769,848 B1 * 9/2020 Wang ...................... G06T 17/20

FOREIGN PATENT DOCUMENTS

| CN | 111325794 A | * | 6/2020 | |
|----|-------------|---|--------|---|
| CN | 112991413 A | * | 6/2021 | ........... G06N 3/0454 |
| EP | 3719747 A1 | * | 10/2020 | ........... G05D 1/0088 |

* cited by examiner

*Primary Examiner* — Charles T Shedrick
(74) *Attorney, Agent, or Firm* — Sheppard, Mullin, Richter & Hampton LLP; Hector A. Agdeppa; Daniel N. Yannuzzi

(57) ABSTRACT

Systems and methods for self-supervised depth estimation using image frames captured from a camera mounted on a vehicle comprise: receiving a first image from the camera mounted at a first location on the vehicle; receiving a second image from the camera mounted at a second location on the vehicle; predicting a depth map for the first image; warping the first image to a perspective of the camera mounted at the second location on the vehicle to arrive at a warped first image; projecting the warped first image onto the second image; determining a loss based on the projection; and updating the predicted depth values for the first image.

20 Claims, 10 Drawing Sheets

(51) Int. Cl.
*G06T 3/00* (2006.01)
*G05D 1/02* (2020.01)
(52) U.S. Cl.
CPC .............. *G06T 2207/20084* (2013.01); *G06T 2207/20221* (2013.01); *G06T 2207/30252* (2013.01)

SYSTEMS AND METHODS FOR MULTI-CAMERA MODELING WITH NEURAL CAMERA NETWORKS

CROSS-REFERENCE TO RELATED APPLICATIONS

This application continuation of and claims the benefit of U.S. patent application Ser. No. 17/021,940 filed Sep. 15, 2020, which is hereby incorporated herein by reference in its entirety for all purposes.

TECHNICAL FIELD

The present disclosure relates generally to depth maps, and in particular, some implementations may relate to systems and methods for self-supervised depth learning.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers, startup companies and others, are racing to develop autonomous vehicle and advanced driver assistance systems (ADAS) technologies. Such technologies are not limited to autonomous vehicles, but can also be used in robotics and other like applications.

Various devices that operate autonomously or that provide information about a surrounding environment use sensors that facilitate perceiving obstacles and additional aspects of the surrounding environment. For example, a robotic device may use information from the sensors to develop awareness of the surrounding environment in order to navigate through the environment and avoid hazards. In particular, the robotic device may use the perceived information to determine a 3-D structure of the environment in order to identify navigable regions. The ability to perceive distances through estimation of depth using sensor data may provide the robotic device with the ability to plan movements through the environment and generally improve situational awareness about the environment. However, depending on the available onboard sensors, the robotic device may acquire a limited perspective of the environment, and, thus, can encounter difficulties in distinguishing aspects of the environment.

In robotics and 3D computer vision, a camera model that relates image pixels and 3D world points is a prerequisite for many tasks, including visual odometry, depth estimation, and 3D object detection. Leveraging images to perceive depth can suffer from difficulties such as depth ambiguities, limited resolution, image artifacts, difficulties with training/learning, and so on. The robot may encounter difficulties when perceiving aspects of the surrounding environment because of such issues and as a result may not develop a comprehensive or accurate awareness of the surrounding environment thereby resulting in difficulties performing various tasks such as navigation.

BRIEF SUMMARY OF THE DISCLOSURE

Various embodiments of the disclosed technology may be implemented using a neural camera model to predict a depth map and ray surfaces without requiring known, calibrated camera models and intrinsics to perform 2D-3D lifting to lift the depth from an image and project onto other images. Additionally, embodiments may be configured to estimate depth across multiple frames in a video captured from a single camera, which can avoid inconsistencies or errors that may arise in areas of the map observed by multiple cameras at different locations on the vehicle.

A method of self-supervised depth estimation using image frames captured from a plurality of cameras mounted on a vehicle in an environment may include: receiving a first image from a camera mounted at a first location on the vehicle, the source image comprising pixels representing a scene of the environment of the vehicle; receiving a reference image from a camera mounted at a second location on the vehicle, the reference image comprising pixels representing a scene of the environment of the vehicle; predicting a depth map for the first image, the depth map comprising predicted depth values for pixels of the first image; warping the first image to a perspective of the camera mounted at the second location on the vehicle to arrive at a warped first image; projecting the warped first image onto the source image; determining a loss based on the projection; and updating the predicted depth values for the first image.

A system for self-supervised learning depth estimation using image frames captured from a plurality of cameras mounted on a vehicle in an environment, the system comprising: a non-transitory memory configured to store instructions; a processor configured to execute the instructions to perform the operations of: receiving a first image from a camera mounted at a first location on the vehicle, the source image comprising pixels representing a scene of the environment of the vehicle; receiving a reference image from a camera mounted at a second location on the vehicle, the reference image comprising pixels representing a scene of the environment of the vehicle; predicting a depth map for the first image, the depth map comprising predicted depth values for pixels of the first image; warping the first image to a perspective of the camera mounted at the second location on the vehicle to arrive at a warped first image; projecting the warped first image onto the source image; determining a loss based on the projection; and updating the predicted depth values for the first image.

A system for self-supervised learning depth estimation, the system may include: a plurality of cameras mounted on a vehicle and configured to capture images of an environment surrounding the vehicle; wherein a first camera is mounted at a first location on the vehicle to capture a source image comprising pixels representing a scene of the environment of the vehicle; and a second camera is mounted at a second location on the vehicle to capture a reference image comprising pixels representing a scene of the environment of the vehicle; a depth encoder configured to receive the first image and to predict a depth map for the first image, the depth map comprising predicted depth values for pixels of the first image; a warping module to warp the first image to a perspective of the camera mounted at the second location on the vehicle to arrive at a warped first image; a projection module to project the warped first image onto the source image; a loss module to determine a loss based on the projection. The system may further include a neural cameral model configured to model intrinsic parameters of the first camera.

The method or operations may further include reiterating the operations of warping the first image, projecting the warped first image and determining the loss using updated predicted depth values for the first image.

In various embodiments, projecting is performed using a neural camera model to model intrinsic parameters of the first camera.

The method or operations may further include predicting a transformation from the first camera to the second camera based on loss calculations between the warped first image and the reference image.

In various embodiments, the second image is an image captured at a time, t+/−1, different from a time, t, at which the first image is captured. A transformation from the first camera position to the second camera position may include movement of the vehicle between times t and t+/−1.

In various embodiments, projecting the warped first image onto the reference image may include lifting 2D points of the warped first image to 3D points, determining a transformation between the first and second cameras and using the transformation to project the 3D points onto the reference image in 2D. The transformation may include a distance in three dimensions between image sensors of the first and second cameras.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
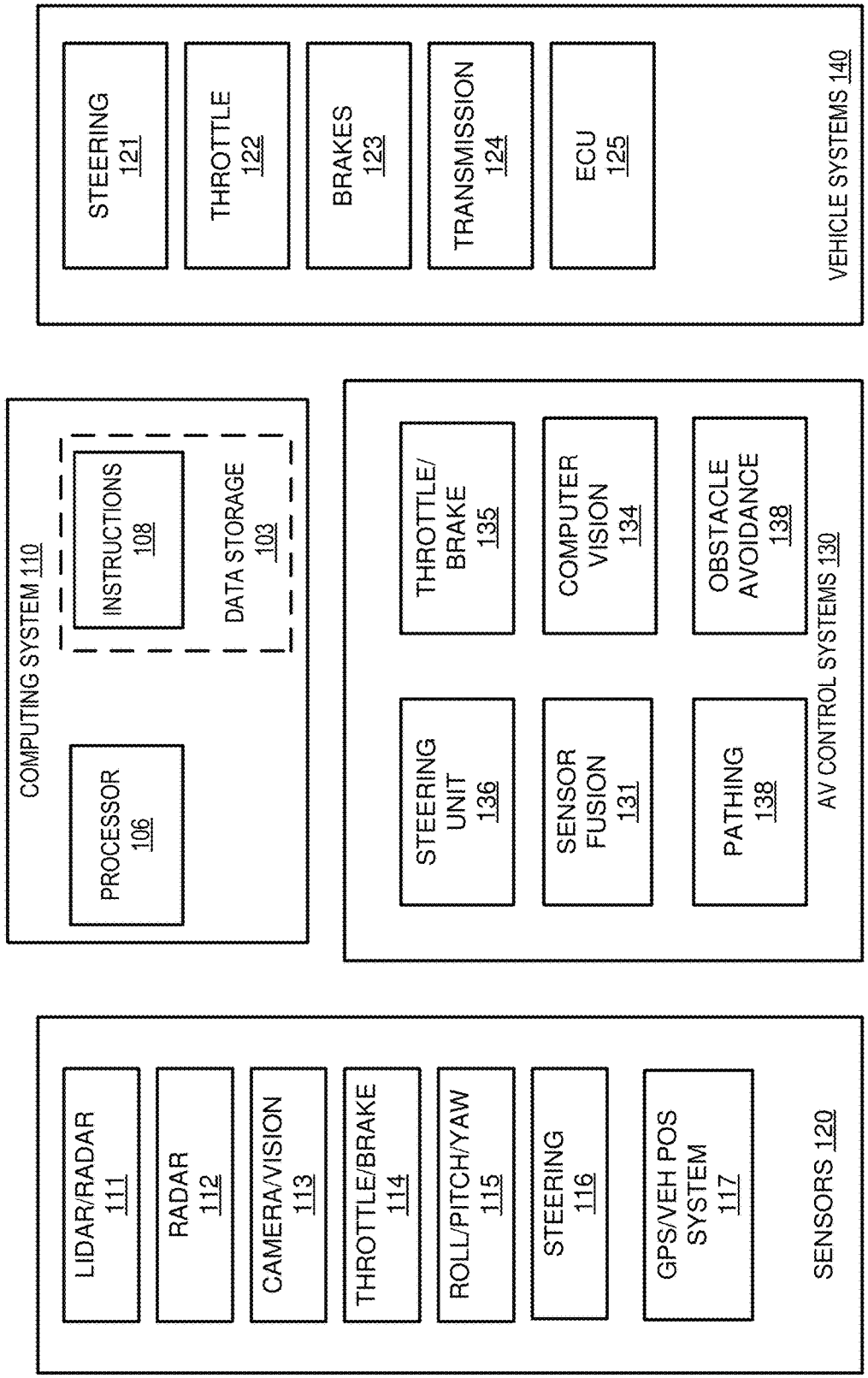
FIG. 1 illustrates an example autonomous or semi-autonomous vehicle with which embodiments of the disclosed technology may be implemented.

The figures are not exhaustive and do not limit the present disclosure to the precise form disclosed.

DETAILED DESCRIPTION

The ability to reconstruct a highly accurate 3D map of a scene, and to localize within the map precisely, is fundamental to ensuring robust autonomous navigation. By directly measuring the 3D geometry information of the scene, LiDAR sensors are more commonly used, making it easier to accomplish tasks such as mapping and localization. However, cameras are preferable over the expensive and bulky LiDAR counterpart, because they are generally cheap and compact while providing richer semantic information about the environment. Cameras, however, are not easily swappable with LiDAR sensors as cameras typically do not provide the same level of information as LiDAR. Embodiments may be configured to use a set of camera images (e.g., RGB images) to iteratively estimate depth for each image, while taking into account camera motion (e.g., corresponding to ego vehicle motion) from one image to the next. Embodiments may use these quantities to construct a metric map of the environment.

Embodiments may be implemented using a neural camera model to predict a depth map and ray surfaces without requiring known, calibrated camera models and intrinsics to perform 2D-3D lifting to lift the depth from an image and project onto other images. Additionally, embodiments may be configured to estimate depth across multiple frames in a video captured from a single camera, which can avoid inconsistencies or errors that may arise in areas of the map observed by multiple cameras at different locations on the vehicle.

Embodiments may be configured to perform self-supervised depth predictions using only RGB images to train neural networks to estimate required quantities such as depth, ego motion (where used), lifting and projection functions. This represents a significant improvement over prior solutions that used only monocular or known stereoptic configurations or relied on costly and highly complex LiDAR solutions.

Embodiments may be implemented to leverage different sources of images including leveraging and learning using multiple camera configurations. Rather than process information from multiple cameras independently, which creates computational overhead and limits the amount of training information that can be used, embodiments represent an improvement in that they allow simultaneous learning from multiple images from multiple cameras. Further embodiments may leverage both temporal contexts for monocular learning and spatial contexts for stereo learning based on camera overlaps. Stereo learning may lead to metrically accurate models and improved results especially in embodiments where the geometric constraints are well defined and the frames are captured at roughly the same time.

Embodiments may be implemented that perform self-supervised learning from multiple cameras using a single neural network representation, including intrinsic and extrinsic information. Embodiments are able to model camera intrinsics and extrinsics simultaneously, without the need for explicit supervision. estimates for each camera intrinsics and extrinsics).

Embodiments may be implemented using camera intrinsic information that is either known or that is learned such as, for example, through a camera model. Camera extrinsics can be learned or fixed, embodiments may be configured to model all camera intrinsics and extrinsics simultaneously, without the need for explicit supervision. However, prior information such as estimates for camera intrinsics and extrinsics, if available, can be used.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

Embodiments may be further implemented to achieve an improved process for providing a dense semantic and spatial understanding of the scene using cameras, without the need for costly and complex LiDAR solutions, and may provide a mechanism to self-supervise the task of image-based depth estimation by bootstrapping geometric constraints inherent in robots, or via sparse depth labels from calibrated LiDAR sensors. Embodiments may be implemented to preserve spatial information during the encoding and decoding stages, thus allowing the generation of more descriptive features, which leads to improved models.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle and robotics platforms.

Figure 2:
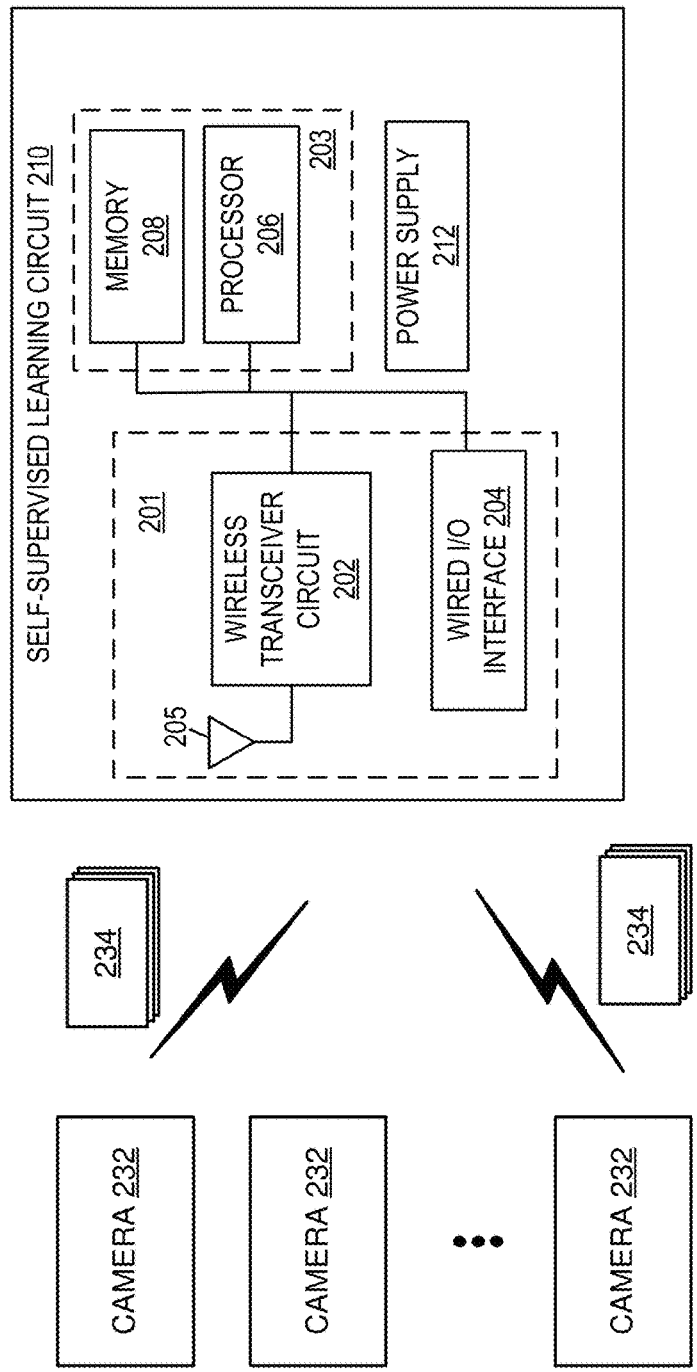
FIG. 2 is a diagram illustrating an example system for performing self-supervised learning in accordance with various embodiments.

FIG. 2 is a diagram illustrating an example system for performing self-supervised depth and pose learning from multiple images in accordance with various embodiments. This example includes a self-supervised learning circuit 210 and one or more cameras 232 mounted to a subject vehicle. Cameras 232 may include, for example, visible light cameras, infrared cameras, thermal cameras, ultrasound cameras, and other cameras configured to capture still or video images 234 and producing an array of pixels or other image elements.

Figure 3:
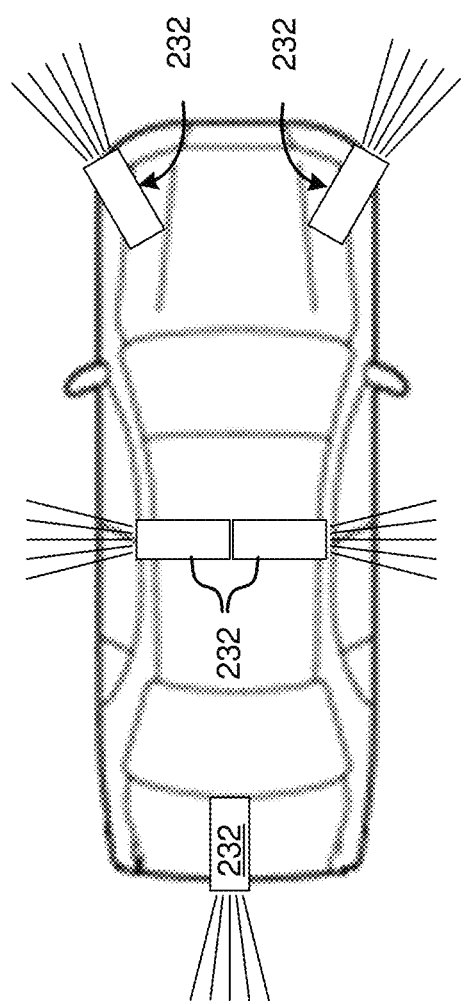
FIG. 3 illustrates one example of a camera layout on a passenger vehicle in accordance with various embodiments.

FIG. 3 illustrates one example of a camera layout on a passenger vehicle in accordance with various embodiments. This example includes five cameras 232. Two forward facing cameras 232, two side facing cameras 232 and one rear facing camera 232. Although five cameras are illustrated in this example, embodiments may be implemented with a fewer or greater quantity of cameras 232. The fields of view of cameras 232 can be configured to be non-overlapping or overlapping or a combination thereof to achieve the desired coverage.

The images 234 from the cameras 232 encompass a field-of-view about the vehicle (or robot) of at least a portion of the surrounding environment. For example, cameras 232 may capture a given field-of-view such as 30°, 60°, 90°, 120° or other FOV span. Accordingly, captured images may, in one approach, generally limited to a subregion of the surrounding 360° environment. Depending on camera mounting, images 234 may be of one or more of a forward-facing view (i.e., in the forward direction of travel) a rear facing view, a side facing view, or some other subregion as defined by the characteristics and mounting position of the relevant camera 232. In further aspects, cameras 232 may be mounted in an array of two or more cameras that capture multiple images of the surrounding environment and may include some overlap among the fields of view of the various cameras. Instructions may cause the processor to stitch the images 234 together to form a comprehensive 360° view (or other view) of the surrounding environment.

Images from camera 232 may generally include visual data of the FOV that may be encoded according to an image standard (e.g., codec) associated with the camera 126. In general, characteristics of the cameras 232 and the image standard (as applicable) define a format of the captured images 234. Thus, while the particular characteristics can vary according to different implementations, in general, the images 234 may have a specified resolution (i.e., height and width in pixels) and format. Thus, for example, the images may include RGB visible light image images, infrared images, black & white images, or other suitable format as may be desired.

Embodiments may be implemented to perform self-supervised learning using images (e.g. images 234) for which there is no explicit additional modality indicating depth of objects within the images. Embodiments may be configured to use self-supervised learning to learn the depths of objects from multiple images, whether gathered temporally from a given camera, spatially from multiple cameras, or a combination of temporal and spatial collection.

Self-supervised learning circuit 210 in this example includes a communication circuit 201, a decision circuit 203 (including a processor 206 and memory 208 in this example) and a power supply 212. Components of self-supervised learning circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to self-supervised learning circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a self-supervised learning circuit 210.

Communication circuit 201 either or both a wireless transceiver circuit 202 with an associated antenna 214 and a wired I/O interface 204 with an associated hardwired data port (not illustrated). As this example illustrates, communications with self-supervised learning circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by self-supervised learning circuit 210 to/from other entities such as one or more cameras 232 and other vehicle sensors and systems as may be appropriate.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

As noted above, embodiments may be implemented to train a neural network using multiple images (e.g., images 234) from multiple cameras (e.g., cameras 232) in a self-supervised manner to train the model and to produce depth maps for the images. In various implementations, the self-supervised learning can be accomplished using images from multiple cameras in which all images are treated as a single entity, and learned simultaneously. This can include camera intrinsics such as camera geometry as well as camera extrinsics, which can include how the cameras are mounted on the vehicle relative to one another. Embodiments may also extend these solutions to a monocular configuration using temporal image capture.

Figure 4:
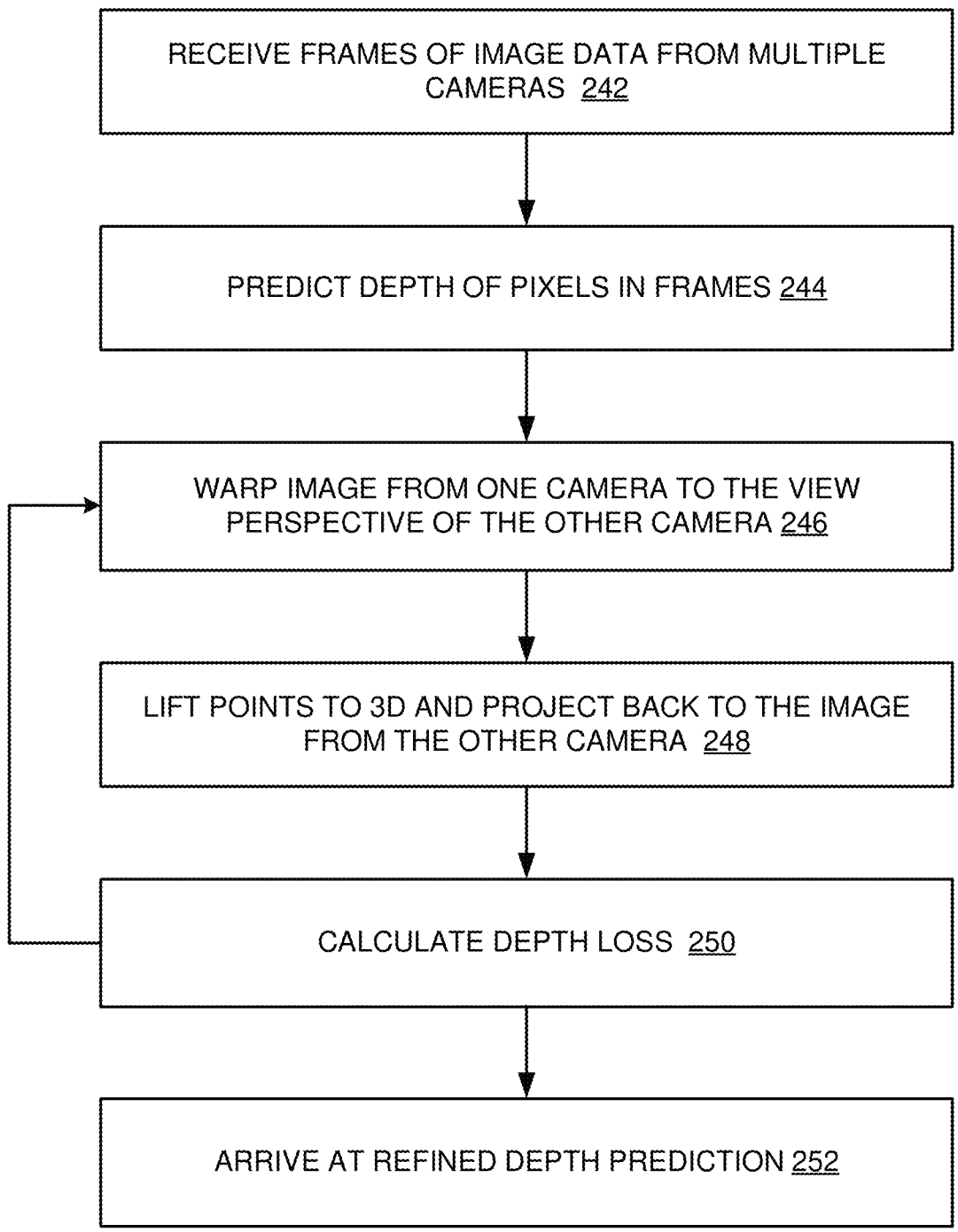
FIG. 4 is an operational flow diagram illustrating an example process for self-supervised multi-camera modeling in accordance with various embodiments.
Figure 5:
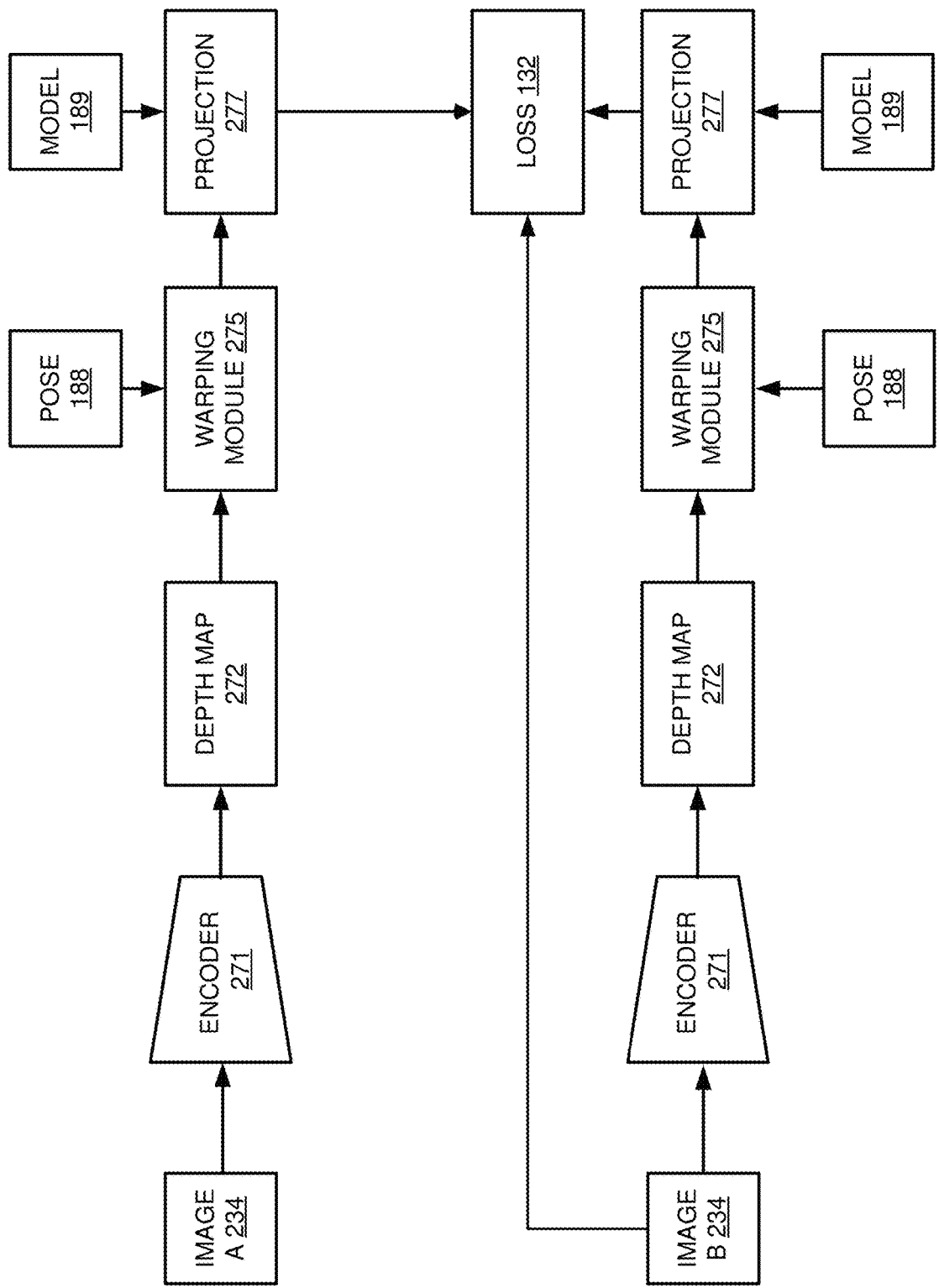
FIG. 5 is a diagram illustrating an example architecture for self-supervised multi-camera modeling in accordance with various embodiments.

FIG. 4 is an operational flow diagram illustrating an example process for self-supervised multi-camera modeling in accordance with various embodiments. FIG. 5 is a diagram illustrating an example architecture for self-supervised multi-camera modeling in accordance with various embodiments. The architecture of FIG. 5 may be implemented using, for example, one or more processors and memory elements such as, for example, processor 206 and memory 208.

Referring now to FIGS. 4 and 5, at operation 242 the self-supervised learning system receives images from multiple cameras. This may be, for example, images 234 from cameras 232. By way of further example, image A 234 can be from a first camera 232 and image be can be from a second camera 232. The system may perform one or more pre-processing adjustments (e.g., brightness, contrast, color, etc.) on the images prior to beginning the learning process.

At operation 244, a depth encoder 271 operates on image 234 A to predict a depth map 272 for the image. Depth encoder 271 can be implemented in some applications as a convolutional neural network (CNN) or other machine learning algorithm. Depth encoder 271 may include, for example, convolutional layers, pooling layers, rectified linear units (ReLU), and/or other functional blocks that process image 234 A to obtain depth information for pixels within the image. In some implementations, encoder 271 can have an encoder/decoder architecture and include an encoder portion and a decoder portion. The input image may be encoded into a feature vector network which is then fed to successive up sampling layers to construct the final depth map at the desired resolution. As seen in the example of FIG.

5, depth encoders 271 can be provided for images from each camera to produce depth maps 272 for the image frames from each camera. Although only two images are shown (each from its respective camera), embodiments may be implemented with a greater quantity of cameras and thus a greater quantity of images.

At operation 246, the image information, comprising image A 234 with its corresponding depth map, is warped by warping module 275 to be aligned with image B 234. Warping can be performed to warp the image to reconstruct same viewpoints from another camera's perspective. For example, warping module 275 can be configured to warp image A 234 to reconstruct the image from the viewpoint of the camera used to capture image B 234. As a further example, warping module 275 can be configured to warp image A 234 to reconstruct the image from the viewpoints of multiple other cameras in the set of cameras. Each of these other cameras may be referred to as a reference camera, and images onto which the warped image is projected may be referred to as reference images.

In some implementations, camera pose information 188 can be used to perform the warping. The pose information 188 may include spatial offsets between the first camera producing image A 234 and reference camera (e.g., in this example the second camera producing image B 234). Given the spatial offset between the cameras on the vehicle (e.g., image frame center-to-center positional offset) this information can be used to warp image A 234 to the perspective of the reference camera or cameras. In some implementations, pose information 188 need not be provided, and can instead be learned in a self-supervised way along with the pixel depths. This can be useful even in embodiments where pose information 188 is known, as it can compensate for the additional changes such as changes based on mechanical uncertainties or temperature-induced displacement.

At operation 248, a projection module 277 lifts points from of the warped image from 2D to 3D and projects them back to 2D to the image from the reference camera (e.g., image B 234). The projection is based on the predicted depth information as well as a camera model 189 for the camera used to capture the image (in this case image A 234). In some applications, the camera model for the camera might not be known. Accordingly, embodiments can implement a camera model to provide the camera intrinsics used to perform the lifting and projection. Projecting the warped image onto the reference image comprises lifting 2D points of the warped image to 3D points, determining a transformation between the two cameras and using the transformation to project the 3D points onto the reference image in 2D. The transformation may include a distance in three dimensions between image sensors of the two cameras.

At operation 250, the 2D projected image can be overlaid onto the image from the reference camera and the difference in pixel locations between the warped image and the reference image (e.g., image B 234) can be used to determine loss in the depth prediction. If the depth measurements are predicted properly by depth map 272 features in the projected image should overlay with features in the reference image with very little or no error. Ideally, the loss in the depth prediction should go to zero, however various factors may prevent that. For example, limitations in the neural network and the presence of dynamic objects may prevent the loss from reaching zero. Furthermore, too low of a loss may indicate overfitting, meaning that the network may perform very well at training time but does not generalize to the test set.

These steps can be repeated multiple times to refine the prediction and arrive at refine depth predictions as shown at 252. At the beginning of the training, the initial depth estimation may be a guess and therefore initial results are expected to be random. As the training progresses through multiple iterations, the depth predictions are refined and the overlapping features in the projected image should tend to overlay with those corresponding features in the reference image or images. When the features overlay identically, or within an acceptable level of tolerance, the self-supervised learning he be said to have converged.

Where the images overlap from among two or more of the cameras used, multiple images can be used to cross train the model for depth predictions. Although the example illustrated in FIG. 5 shows images 234 from two cameras, this architecture can be extended to a quantity of cameras greater than two where corresponding image frames from multiple cameras are captured, a depth network used to predict their depth maps, and the images (e.g. a subset of all but one of the images) are warped and the loss computed. Accordingly, some or all of the cameras in the system may have corresponding encoders 271, warping modules 275 and projection modules 277 to predict depth maps 272 for their respective images, warp them to the perspective of one or more reference cameras and project them to 3D and back to a 2D image or images of the one or more reference cameras and compute the loss or losses to determine convergence. Accordingly, the example of FIG. 5 illustrates encoding, warping and projection for image B 234 with the understanding that this functionality may be provided for each camera in the system.

In addition to or instead of spatial overlap of images, temporal overlap may also be used. For example, instead of or in addition to projecting the warped image to another camera in the same timestamp, the system can be configured to project the warped image to the same camera in another timestamp or to another camera in another timestamp. Temporal overlap can be applied in a monocular or stereoptic manner (e.g., a hybrid of monocular and stereoptic) to train depth and pose for the cameras.

Embodiments may be implemented that rely on overlap of images to achieve convergence of depth predictions for features common to the overlapping images. Embodiments may be also implemented to treat the system of cameras as a single sensor even where there are not necessarily overlapping fields of view.

However, the standard projective geometry for cameras depends on a center of projection, and a system of cameras is decidedly non-central. Embodiments may be configured to use Plücker vectors to remove the dependence on a center of projection. Instead of separate unit vector-based ray surface for each camera, embodiments may instead have a collection of rays from all cameras in a canonical coordinate frame. These rays may be parameterized as Plücker lines. Pixels in individual cameras on the multi-camera rig may be replaced by the collection of rays sampled by the multi-camera system.

Plücker coordinates are homogeneous coordinates for a line 1 ir∈3-space. They have a line direction q and a "moment vector" m where for any point p on l, $m=p \times q$. Note that for c not equal to 0, (q, m) and (c q, c m) represent the same line. Recalling that a line in 3-space has 4 degrees of freedom, embodiments may set $q=1$ and $q \cdot m=0$. Then the equation for the set of all points along the line is $(q \times m) + \alpha q$ for all $\alpha \in R$. In the case of generalized cameras, $\alpha$ represents the Euclidean depth.

Consider the special case of a second camera, where rotation R and translation t that transforms points from the second camera's coordinates to canonical frame coordinates (e.g., the first camera). Then, for the Plücker vector (q,m) there will be a direction vector $q=RK(x,y,1)^T$ and moment vector $m=q \times t$. This can be used to describe a list of vectors in the same space—for all pixels (x,y) in the first image there is $(K(x,y,1)^T, 0))$ as the rays, and in the second camera for all pixels (x,y), $(RK(x,y,1)^T, RK(x,y,1)^T \times t)$.

For a collection of cameras $i \in \{1, 2, 3, \ldots\}$, mounted in arbitrary directions to a fixed frame, camera extrinsics are known and represented by $R_i$, $t_i$. For ease of discussion, assume that all of the cameras have the same intrinsics K.

Replace each image pixel $x_{ij}$ in camera i with a ray expressed as a Plücker line that passes through the camera center of i and the normalized image coordinate $\hat{x}_{ij}=K^{-1}x_{ij}$. In this notation, the direction for the ray is $q_{ij}=R_i\hat{x}_{ij}$ and the moment vector is $m_{ij}=q_{ij} \times t_i$. The Plücker coordinate may be referred to as $I_{ij}=[q_{ij}, m_{ij}]$.

Consider the motion of the generalized camera between time steps t and t+1 (or, alternatively, t−1 and t). In the projective camera case the epipolar geometry can be described by point correspondences, but instead of the correspondence of two points is the intersection of two rays.

These corresponding rays may be referred to as rays $I_{ij,t} \leftrightarrow I_{ij,t+1}$, and consider the transformation from t to t+1 of the generalized camera as being given by a global R, t. This leads to the following generalized epipolar constraint:

$$1_{ij,t+1}^T \begin{bmatrix} E & R \\ R & 0 \end{bmatrix} 1_{ij,t} = 0$$

where, E is the standard essential matrix $E=[t]_x R$. The block matrix in the middle is referred to as the "generalized essential matrix."

As described above, in conventional depth and ego-motion settings, multiple all cameras are treated individually. Accordingly, for camera i and time step t→t+1 the depth-image based rendering equation, below, is used to determine the correspondence between pixels $x_t$ and $x_{t+1}$:

$$x_t \sim K\hat{T}_{t \to t+1} \hat{D}_{t+1}(p_{t+1}) K^{-1} x_{t+1}$$

Over time, these pixel correspondences may become quite good. In situations in which all the cameras are identical and known and that the extrinsics is known these known pixel correspondences can be converted into ray correspondences, and pixels converted to Plucker lines, yielding $I_t \leftrightarrow I_{t+1}$.

Embodiments may use the following procedure to compute a single R, t from a collection of cameras. Perform self-supervised ego-motion and depth individually for all cameras, either sharing weights or training separately. Then, after some warmup period begin to use the known (or learned camera intrinsics) to lift the known pixel correspondences into ray correspondences $I_t \leftrightarrow I_{t+1}$. Then, use the generalized epipolar constraint to supervise a network predicting a generalized camera pose R, t. This network may then take the set of all images at time t and at time t+1 and concatenate them to produce a single R, t.

This network may be supervised by the following loss term, the generalized epipolar loss (GEL):

$$l_{GEL} = l_{ij,t+1}^T \begin{bmatrix} E & R \\ R & 0 \end{bmatrix} l_{ij,t}$$

which may be added as a term to the loss function of a shared pose network, or to the loss of the individual pose networks.

Various above examples describe self-supervised depth learning (or pose learning or both) using images from multiple cameras simultaneously. Various above examples also describe using multiple images captured at different times instead of or in addition to images captured simultaneously from different cameras. The various cameras can include cameras mounted at different mounting locations of the vehicle and in embodiments these cameras may include different types of cameras, including cameras otherwise intended for alternative purposes. In still further embodiments, cameras mounted on different vehicles may be used.

A further example can use a single camera that is repositioned to capture fields of view from different perspectives in which at least portions of the captured scene are overlapping in the various fields of view. The images from the different perspectives captured at different times can be applied in the same manner as multiple images captured from different cameras simultaneously, similar to that has described above with reference to FIGS. 4 and 5.

Embodiments may be implemented to leverage the neural camera model, which is described above, may be configured to produce pixel-wise ray surface vectors that enable the learning of any camera geometry, going from the standard simple pinhole model to more complex geometries such as fisheye and catadioptric. Implementations may combine the depth and intrinsic networks as the same, with different heads to different outputs. However, embodiments may be implemented to use two completely different networks, thus decoupling depth and intrinsics so they can produce specific features focused at each task. Furthermore, as described above, embodiments may learn from a single dataset, with images of the data set having been produced from any camera model. Images may be combined from multiple cameras simultaneously, which enables the intrinsics network to generate features that are generic enough to accommodate all the different camera geometries used at training time. Embodiments may further perform data augmentation in the form of modifications to camera geometries, artificially changing parameters such as focal length and distortions to increase the variability of training data and by extension increasing the genericity of resulting features.

Figure 6:
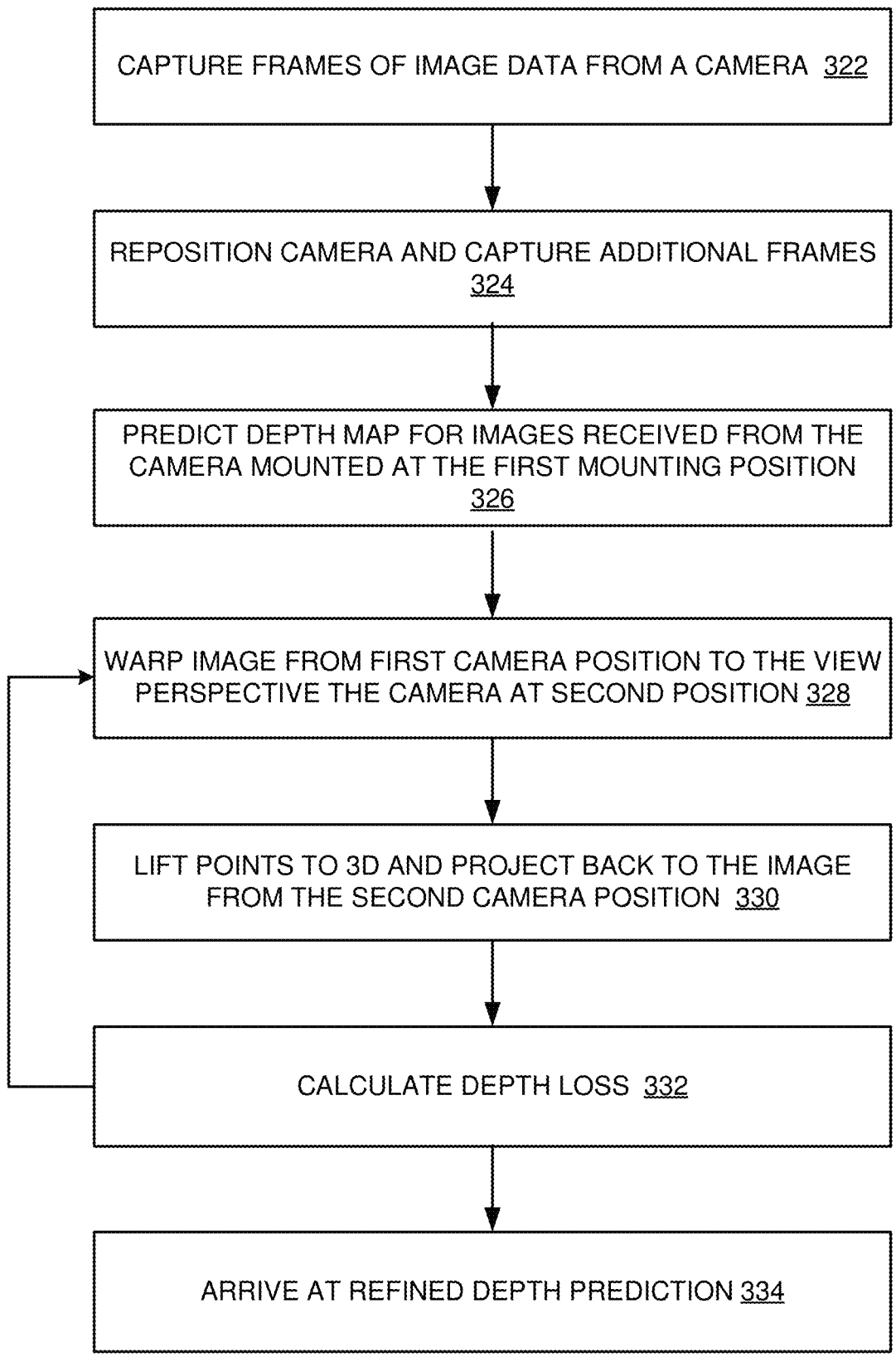
FIG. 6 is an operational flow diagram illustrating an example process for self-supervised camera modeling using the same camera in different camera positions in accordance with various embodiments.

FIG. 6 is an operational flow diagram illustrating an example process for self-supervised camera modeling using the same camera in different camera positions in accordance with various embodiments. The same or similar architecture illustrated in FIG. 5 can be used to perform this process in embodiments. Where a single camera is used and moved from one mounting position to another to capture multiple images, a first image can come from a camera at one mounting position and a second image (e.g., the reference image) can come from the same camera at a different mounting position. More than two different mounting positions can be utilized.

Referring now to FIG. 6, at operation 322 the camera is mounted at a first mounting position (e.g., a mounting position on the vehicle), and images are captured using the camera. The self-supervised learning system receives images captured using the camera at this first mounting position. At operation 324, the camera is mounted at a second mounting position (e.g., a mounting position on a vehicle), and images are captured using the camera at the second mounting position. The self-supervised learning system receives images captured using the camera at the second mounting position. The system may perform one or more pre-processing adjustments (e.g., brightness, contrast, color, etc.) on the images prior to beginning the learning process.

At operation 326, a depth encoder (e.g., depth encoder 271) operates on the image received from the camera the first mounting position to predict a depth map (e.g., depth map 272) for the image. The depth encoder can be implemented in some applications as a convolutional neural network (CNN) or other machine learning algorithm. The depth encoder may include, for example, convolutional layers, pooling layers, rectified linear units (ReLU), and/or other functional blocks that process the received image to obtain depth information for pixels within the image. In some implementations, the depth encoder can have an encoder/decoder architecture and include an encoder portion and a decoder portion. The input image may be encoded into a feature vector network which is then fed to successive up sampling layers to construct the final depth map at the desired resolution.

Similar to the example of FIG. 5, depth encoders can be provided for images from each camera mounting position to produce depth maps for the image frames from the camera mounted at each position. Although only two images are shown (each from its respective camera mounting position), embodiments may be implemented with a greater quantity of camera mounting positions and thus a greater quantity of images.

At operation 328, the image information from the image captured by the camera the first mounting position, is warped by a warping module (e.g., warping module 275) to be aligned with a corresponding image captured by the camera added second mounting position. Warping can be performed to warp the image to reconstruct the same viewpoints from the camera's perspective at the different mounting position. For example, the warping module can be configured to warp the image captured at the first mounting position to reconstruct the image from the viewpoint of the camera used to capture images at the second mounting position. As a further example, the warping module can be configured to warp received image from the first mounting position to reconstruct the image from the viewpoints of multiple other camera mounting positions. Images from each of these other camera mounting positions may be referred to as a reference image.

In some implementations, camera pose information can be used to perform the warping. The pose information may include spatial offsets between the first camera producing image and camera mounted to capture the reference image. Given the spatial offset between the camera mounting positions on the vehicle (e.g., image frame center-to-center positional offset) this information can be used to warp the image received by the camera the first mounting position to the perspective of the camera or cameras at another mounting position. In some implementations, pose information need not be provided, and can instead be learned in a self-supervised way along with the pixel depths. This can be useful even in embodiments where pose information is known, as it can compensate for the additional changes such as changes based on mechanical uncertainties or temperature-induced displacement. The transformation used for image warping can consider not only the transformation required to account for different mounting positions on the vehicle, but can be augmented to include information to reflect any distance traveled between the relative times of image capture. Pose can be trained, for example, using a pose network (not shown in FIG. 5) that can be configured to receive image A 234 and image B 235 and to predict the spatial offset based on differences between the images. Either or both (or all if more than two) images may be transformed based on a predicted pose to overlay onto the other image and the loss computed. The loss can be used to alter the transformation and update the prediction.

At operation 330, a projection module (e.g., projection module 277) lifts points from of the warped image from 2D to 3D and projects them back to 2D to the image from the camera at the second mounting position. The projection is based on the predicted depth information as well as a camera model for the camera used to capture the image. In some applications, the camera model for the camera might not be known. Accordingly, embodiments can implement a camera model to provide the camera intrinsics used to perform the lifting and projection. In various embodiments, the warped image At operation 332, the 2D projected image can be overlaid onto the image from the camera at the second mounting location and the difference in pixel locations between the warped image and the reference image can be used to determine loss in the depth prediction. If the depth measurements are predicted properly by depth map features in the projected image should overlay with features in the reference image with very little or no error.

These steps can be repeated multiple times to refine the prediction and arrive at refine depth predictions as shown at 334. At the beginning of the training, the initial depth estimation may be a guess and therefore initial results are expected to be random. As the training progresses through multiple iterations, the depth predictions are refined and the overlapping features in the projected image should tend to overlay with those corresponding features in the reference image or images. When the features overlay identically, or within an acceptable level of tolerance, the self-supervised learning he be said to have converged.

As noted above, embodiments may use a camera model to model camera intrinsics. This can be useful, for example, in applications in which camera calibration information is not known. A camera model may also be used to allow multiple cameras of different camera types to be used, again without knowing camera intrinsics for some or all of the various different camera types.

In a self-supervised monocular structure-from-motion setting, a neural camera model may be configured to learn: (a) a depth model fd: I→D, that predicts a depth value $\hat{d}$=fd(I (p)) for every pixel p=$[u, v]^T$ in the target image $I_t$ (up to a scale factor); and (b) an ego-motion model $f_x$: ($I_t$, IC)→$X_{t→c}$, that predicts the rigid transformations for all c ∈ C given by $X_{t→c}$=($^{Rt}_{01}$)∈SE(3), between the target image $I_t$ and a set of context images $I_c$∈$I_C$, taken as adjacent frames in a video sequence.

Embodiments may be configured to train depth and pose networks simultaneously in a self-supervised manner. This may be achieved by projecting pixels from a context image $I_c$ onto a target image $I_t$, and minimizing the photometric reprojection error between original target image, $I_t$ and synthesized $\hat{I}_t$ images.

Figure 7:
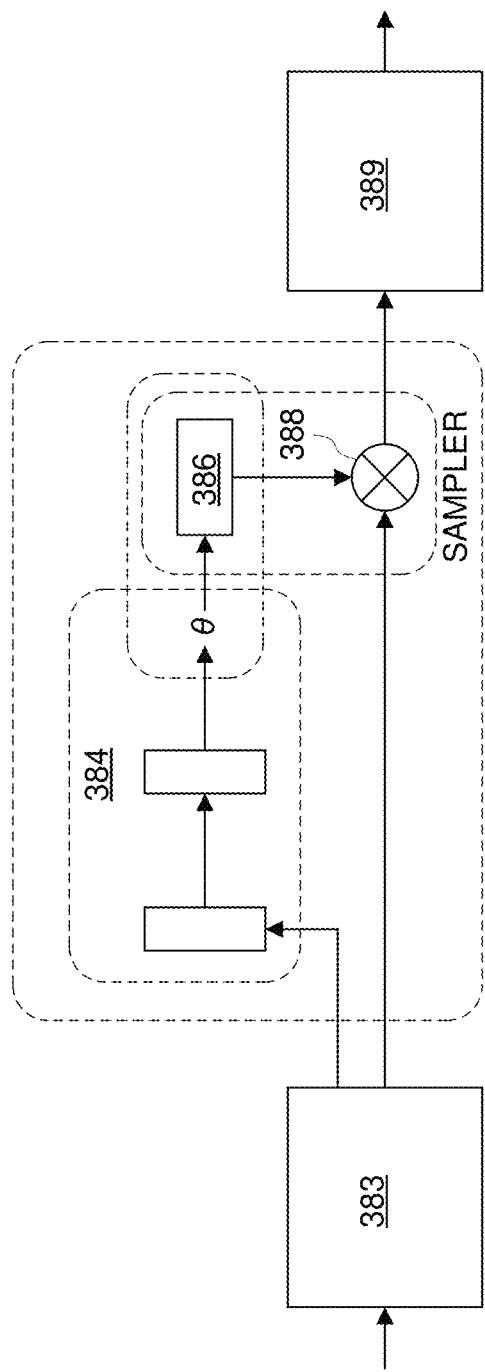
FIG. 7 illustrates an example architecture of a spatial transformer module in accordance with various embodiments.

The image synthesis operation in various embodiments may be performed using Spatial Transformer Networks (STNs) via grid sampling with bilinear interpolation, and may thus be fully differentiable. FIG. 7 illustrates an example architecture of a spatial transformer module in accordance with various embodiments. In this example, an input feature map 383 is provided to a localization network 384. Localization network 384 may be configured to regress the transformation parameters θ. The regular spatial grid may be transformed to a sampling grid 386. Sampling grid 386 may be applied to the input feature map via sampler 388 to produce warped output feature map 389. The combination of the localization network 384 and sampling mechanism (e.g., sampler 388) defines the example spatial transformer depicted in this embodiment.

In various embodiments, the pixel-wise warping may take the form of:

$$\hat{p}_t = \pi_c(R_{t \to c} \phi_t(p_t, d_t) + t_{t \to c}) \quad (1)$$

where $\phi(p, d) = P$ is responsible for 2D-to-3D conversion by lifting an image pixel in homogeneous coordinates $p = [u, v, 1]^T$ to a 3D point $P = [x, y, z]^T$ based on its depth value d. Conversely, $\pi(P) = p$ projects a 3D point back onto the image plane as a pixel. For the standard pinhole camera model, used in many conventional learning-based monocular depth estimation algorithms, these functions have a closed-form solution and can be calculated as:

$$\phi(p, d) = dK^{-1}p = d \begin{bmatrix} f_x & 0 & c_x \\ 0 & f_y & c_y \\ 0 & 0 & 1 \end{bmatrix}^{-1} [u \ v \ 1]^T \quad (2)$$

$$\pi(P) = \frac{1}{P_z} KP = \frac{1}{z} \begin{bmatrix} f_x & 0 & c_x \\ 0 & f_y & c_y \\ 0 & 0 & 1 \end{bmatrix} [x \ y \ z]^T, \quad (3)$$

with intrinsics matrix K, focal length ($f_x$, $f_y$) and principal point ($c_x$, $c_y$). These parameters are usually assumed to be known, obtained using prior independent calibration techniques, or are learned as additional variables during the training stage.

The self-supervised objective loss to be minimized is of the form:

$$\mathcal{L}(I_t, \hat{I}_t) = \mathcal{L}_p(I_t, I_C) + \lambda_d \mathcal{L}_d(\hat{D}_t), \quad (4)$$

which is the combination of an appearance-based loss $\mathcal{L}_p$ and a weighted depth smoothness loss $\mathcal{L}_d$, described below in more detail. This loss is then averaged per pixel and batch during training to produce the final value to be minimized. For simplicity, embodiments may be implemented that do not explicitly model dynamic objects (which break the static scene assumption), although these could be easily incorporated into various embodiments framework to further improve experimental results.

A camera model may be defined by two operations: the lifting of 3D points from 2D image pixels, i.e., $\phi(p, d) = P$; and the projection of 3D points onto the image plane, i.e., $\pi(P) = p$. A standard pinhole perspective model provides closed-form solutions to these two operations, as matrix-vector products using the closed-form solution (Equations 2-3, above). Typical camera models include a ray surface that associates each pixel with a corresponding direction, offering a generic association between 3D points and image pixels. However, although lifting is simple and can be computed in closed form, the projection operation has no closed-form solution and is non-differentiable, which makes such models unsuitable for learning-based applications.

Figure 8:
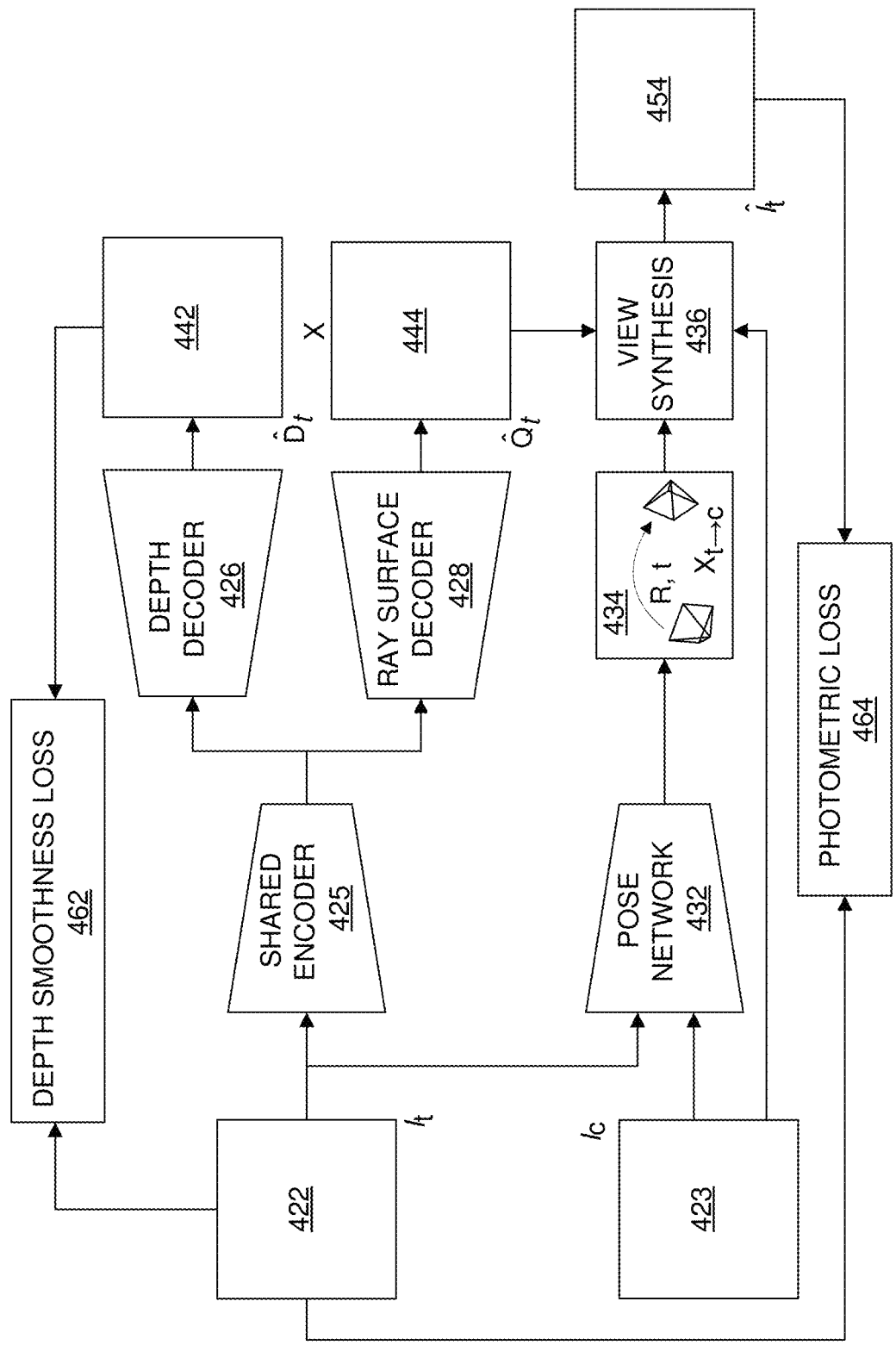
FIG. 8 illustrates an example of a training architecture in accordance with various embodiments.

Accordingly, embodiments may use a neural camera model that is differentiable, and thus amenable to end-to-end learning in a self-supervised monocular setting. FIG. 8 illustrates an example of a training architecture in accordance with various embodiments. This example provides a self-supervised monocular depth pose and ray surface estimation architecture in accordance with various embodiments. This example operates on multiple images, a target image 422 and a context image 423. Target image 422 is provided to a shared encoder 425.

In various embodiments, for each pixel $p = [u, v]^T$, a corresponding camera center $S(u, v)$ may be introduced as a 3D point and a unitary ray surface vector $Q(u, v) \in \mathbb{R}^3$, with $D(u, v)$ representing the scene depth along the ray. Note that, for central cameras, the camera center is the same for all points, so that $S(u, v) = S$, $\forall (u, v)$.

The shared encoder 425 may be configured to accept an image as input, and map it to a feature space that encodes both high-level image properties such as structure, as well as artefacts that may be due to the camera configuration, such as various distortions. These features are then "decoded" in depth decoder 426 and ray surface decoder 428 to yield the per pixel depth and per pixel ray surface.

Embodiments include a depth decoder 426, which may be implemented to provide a predicted depth map 442 for the target image. Embodiments may also include a ray surface decoder 428 that predicts a $\hat{Q} = f_r(I)$ to produce a predicted ray surface estimate 444 in the form of, $f_r: I \to Q$.

As shown in the example of FIG. 8, embodiments may be configured to train the depth and pose networks simultaneously in a self-supervised manner. Accordingly, target image 422 and context image 423 are provided to train a pose network 432. Training the depth and pose networks simultaneously in a self-supervised manner may be achieved by projecting pixels from the context image $I_c$ onto the target image $I_t$, and minimizing the photometric reprojection error between original $I_t$ and synthesized $\hat{I}_t$ images.

Embodiments may be implemented to accommodate appearance-based loss. the similarity between target It and warped $\hat{I}_t$ images may be estimated in some embodiments at the pixel level using Structural Similarity (SSIM) combined with an L1 loss term:

$$\mathcal{L}_p(I_t, \hat{I}_t) = \alpha \frac{1 - SSIM(I_t, \hat{I}_t)}{2} + (1 - \alpha) \|I_t - \hat{I}_t\| \quad (5)$$

In order to increase robustness against parallax or the presence of dynamic objects, embodiments may be implemented to consider only the minimum pixel-wise photometric loss value for each context image in $I_C$. The intuition is that the same pixel will not be occluded or out-of-bounds in all context images, and its association with minimal photometric loss should be correct. Similarly, embodiments may mask out static pixels by removing those with a warped photometric loss $\mathcal{L}_p(I_t, \hat{I}_t)$ higher than their original photometric loss $\mathcal{L}_p(I_t, I_c)$.

Embodiments may compute a depth smoothness loss 462 operating on the predicted depth map 442 and the target image 422. To regularize the depth in textureless image regions, embodiments may incorporate an edge-aware term that penalizes high depth gradients in areas with low color gradients:

$$\mathcal{L}_s(\hat{D}_t) = |\delta_x \hat{D}_t| e^{-|\delta_x I_t|} + |\delta_y \hat{D}_t| e^{-|\delta_y I_t|}, \quad (6)$$

Given the above definitions, for any pixel p its corresponding 3D point P can be obtained as follows:

$$P(u, v) = S(u, v) = \hat{D}(u, v) \hat{Q}(u, v) \quad (7)$$

In other words, embodiments may scale the predicted ray vector $\hat{Q}(u, v)$ by the predicted depth $\hat{D}(u, v)$ and offset it by the camera center $S(u, v)$, which is the same for all pixels in a central camera. However, because embodiments may operate in a purely self-supervised monocular learning-based setting, the resulting depth and pose estimates are in some embodiments generated only up to a scale factor. This means that, for simplicity and without loss of generality, the system can assume that the camera center coincidences with the origin of the reference coordinate system and set $S(u, v) = [0, 0, 0]^T \forall u, v \in I$.

Consider $P_t = \{P_j\} Hj=1$ W, produced by lifting pixels from $I_t$ as 3D points. In the standard pinhole camera model, projection is a simple matrix-vector product (Equation 3). For embodiments of the neural camera model, however, for each 3D point $P_j$ the process identifies the corresponding pixel $p_i \in I_c$ with ray surface vector $\hat{Q}_i = \hat{Q}_c(p_i)$ that most closely matches the direction of Pj to the camera center $S_c$. Call this direction $r_c \rightarrow j = P_j - S_c$. Thus, the process finds $p^*_i$ such that:

$$p_i^* = \arg\max_{p_i \in I_c} \{\hat{Q}_c(p_i), r_{c \rightarrow j}\} \quad (8)$$

Solving this problem may include searching over the entire ray surface $\hat{Q}_c$ and can be computationally expensive: a camera producing images of resolution H×W would require a total of $(HW)^2$ evaluations, as each 3D point from Pt can be associated with any pixel from the context image, $I_c$. Additionally, the argmax (the elements of the domain of the function at which the function values are maximized) operation is non-differentiable, which precludes its use in an end-to-end learning-based setting. Example solutions to each of these issues are presented below, which in conjunction enable the simultaneous learning of depth, pose and our proposed neural camera model in a fully self-supervised monocular setting.

To project the 3D points Pt onto context image $I_c$, embodiments may find for each $P_j \in Pt$ the corresponding pixel pi $\in I_c$ with surface ray $\hat{Q}i$ closest to the direction rc,j=Pj−$S_c$. Taking the dot product of each direction $r_{c \rightarrow j}$ with each ray vector $\hat{Q}i$, we obtain a $(H \times W)^2$ tensor M where each coefficient Mij=($\hat{Q}i$, $r_{c \rightarrow j}$)=M(pi, Pj) represents the similarity between $\hat{Q}i$ and $r_{c \rightarrow j}$. With this notation, projection for a neural camera model may be given by selecting the i* index for each Pj with:

$$i^* = \arg\max_i M(p_i, P_j) \quad (9)$$

To make this projection operation differentiable, embodiments may substitute argmax with a softmax with temperature t, thus obtaining a new tensor M~ defined as:

$$\tilde{M}(p_i, P_j) = \frac{\exp(M(p_i, P_j)/\tau)}{(\Sigma_i \exp(M(p_i, P_j)/\tau))} \quad (10)$$

Softmax is a function that takes an vector of N real numbers, and normalizes it into a probability distribution of N probabilities proportional to the exponentials of the input numbers.

Embodiments may anneal the temperature over time so that the tensor becomes approximately one-hot for each pixel. The 2D-3D association used for projection may be obtained by multiplying with a vector of pixel indices. Thus, projection can now be implemented in a fully differentiable way using STNs.

Figure 9:
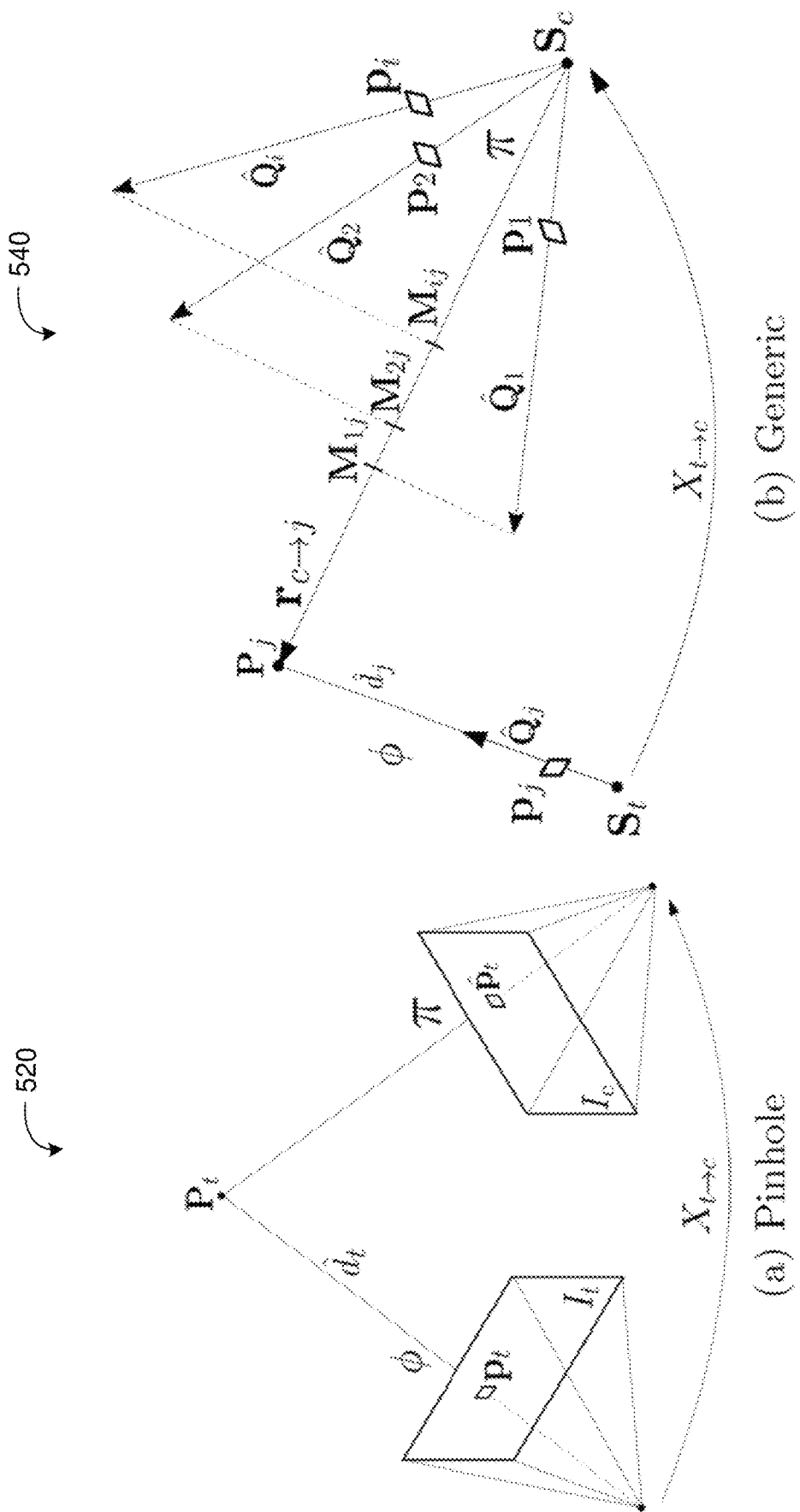
FIG. 9 is a diagram illustrating an example comparison of lifting and projection operations between the standard pinhole and various embodiments of the neural camera model.

FIG. 9 is a diagram illustrating an example comparison of lifting and projection operations between the standard pinhole and various embodiments of the neural camera model. The standard pinhole model is shown at 520 and shows the rigid transformation Xt→c. The example at 540 shows embodiments of the neural camera model, for a single pixel $p_j$ considering target $I_t$ and context $I_c$ images. Straight arrows in the example at 540 represent unitary ray surface vectors Q(p), drawn out of scale to facilitate visualization. In this example, p1 is associated to pj, because it satisfies Equation 9.

In the structure-from-motion setting, learning a randomly initialized ray surface is similar to learning 3D scene flow, which is typically a challenging problem when no calibration is available, particularly when considering self-supervision. To avoid this random initialization, embodiments may be configured to learn instead a residual ray surface $\hat{Q}_r$, that is added to a fixed ray surface template $Q_0$ to produce $Q^\hat{} = Q_0 + \lambda_r \hat{Q}_r$. The introduction of such template allows the injection of geometric priors into the learning framework, because if some form of camera calibration is known—even if only an approximation—the system can generate its corresponding ray surface, and use this as a starting point for further refinement using the learned ray surface residual.

If no such information is available, embodiments may be configured to initialize a "dummy" template based on a pinhole camera model, obtained by lifting a plane at a fixed distance (Equation 2) and normalizing its surface. For stability, embodiments may be configured to start training only with the template $Q_0$ and gradually introducing the residual $\hat{Q}_r$, by increasing the value of $\lambda_r$. Interestingly, this pinhole prior significantly improves training stability and convergence speed even in a decidedly non-pinhole setting (i.e., catadioptric cameras).

In a generalized version of the neural camera model, rays at each pixel are independent and can point in completely different directions. Because of that, Equation 9 requires searching over the entire image. This may quickly become computationally infeasible at training time even for lower resolution images, both in terms of speed and memory footprint. To alleviate such heavy requirements, embodiments may be configured to restrict the optimal projection search (Equation 10) to a small h×w grid in the context image $I_c$ surrounding the (u, v) coordinates of the target pixel $p_t$. The motivation is that, in most cases, camera motion will be small enough to produce correct associations within this neighborhood, especially when using the residual ray surface template described above. To further reduce memory requirements, the search may be performed on the predicted ray surface at half-resolution, which is then upsampled using bilinear interpolation to produce pixel-wise estimates. At test-time none of these approximations are necessary, and we can predict a full-resolution ray surface directly from the input image.

Figure 10:
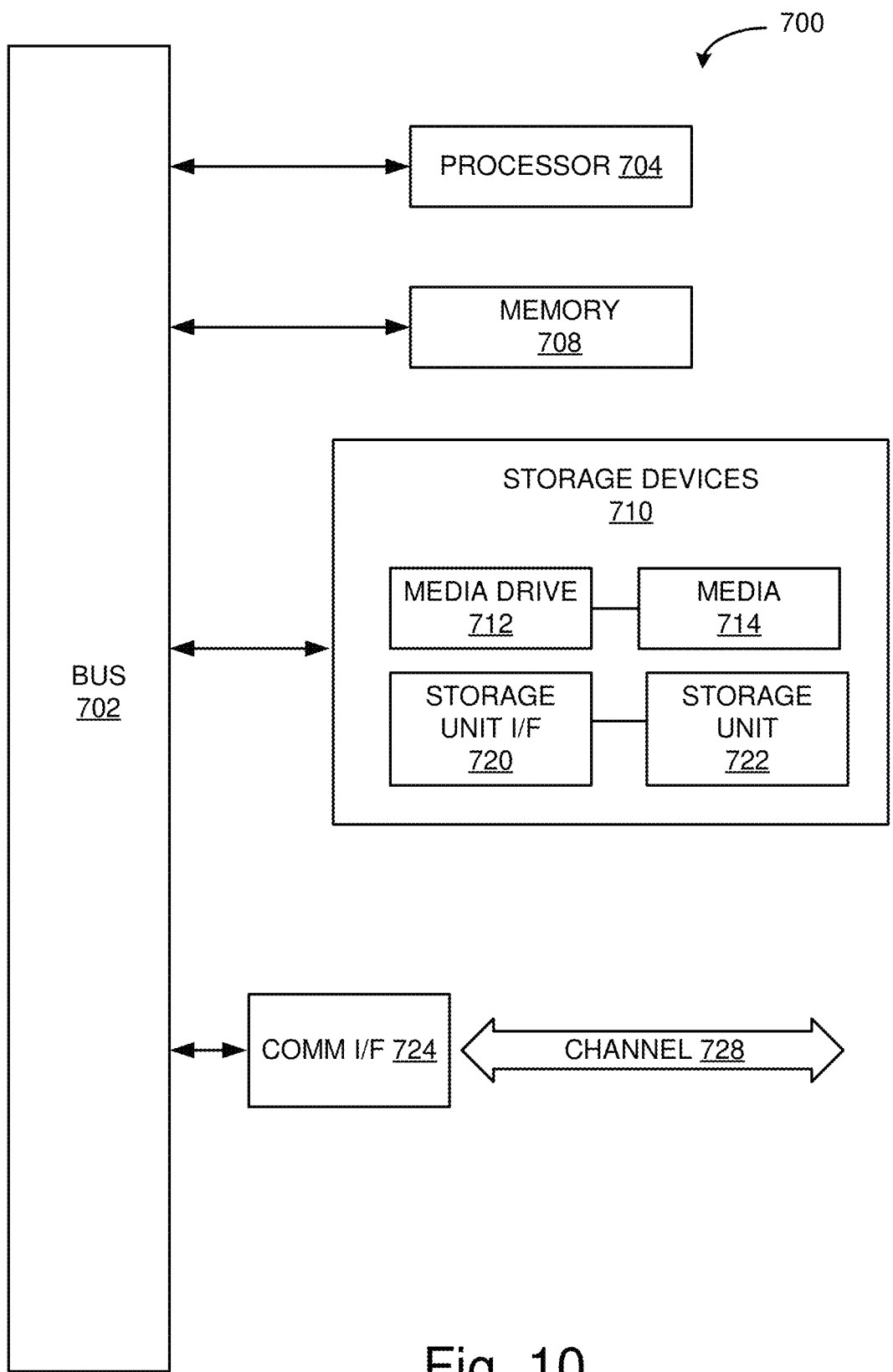
FIG. 10 is an example computing component that may be used to implement various features of embodiments described in the present disclosure.

As used herein, the term module may be used describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 10. Various embodiments are described in terms of this example-computing component 700. After reading this description, it will become apparent to a person skilled in the relevant art how to implement the application using other computing components or architectures.

Referring now to FIG. 10, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of self-supervised depth estimation using image frames captured from a camera, comprising:
   receiving a first image from the camera mounted at a first location, the first image comprising pixels representing a first scene of an environment of a vehicle;
   receiving a second image from the camera mounted at a second location, the second image comprising pixels representing a second scene of the environment of the vehicle;
   predicting a depth map for the first image, the depth map comprising predicted depth values for pixels of the first image;
   warping the first image to a perspective of the camera mounted at the second location to arrive at a warped first image;
   projecting the warped first image onto the second image; and
   determining a loss in the predicted depth values based on the projection.

2. The method of claim 1, further comprising:
   updating the predicted depth values for the first image based on the loss; and
   reiterating the warping of the first image, projecting the warped first image, and determining a loss using the updated predicted depth values for the first image.

3. The method of claim 1, wherein projecting is performed using a neural camera model to model intrinsic parameters of the camera.

4. The method of claim 1, further comprising:
   predicting a transformation from the first location to the second location based on loss calculations between the warped first image and the second image.

5. The method of claim 1, wherein the second image is an image captured at a time, t+/−1, different from a time, t, at which the first image is captured.

6. The method of claim 5, wherein a transformation from the first location to the second location includes movement of the vehicle between times t and t+/−1.

7. The method of claim 1, wherein projecting the warped first image onto the second image comprises lifting 2D points of the warped first image to 3D points, determining a transformation between the first and second locations and using the transformation to project the 3D points onto the second image in 2D.

8. The method of claim 7, wherein the transformation comprises a distance in three dimensions between an image sensor of the camera at the first location and the image sensor of the camera at the second location.

9. A system for self-supervised learning depth estimation using image frames captured from a camera, the system comprising:
   a non-transitory memory configured to store instructions;
   a processor configured to execute the instructions to perform operations of:
      receiving a first image from the camera mounted at a first location, the first image comprising pixels representing a first scene of an environment of a vehicle;
      receiving a second image from the camera mounted at a second location, the second image comprising pixels representing a second scene of the environment of the vehicle;
      predicting a depth map for the first image, the depth map comprising predicted depth values for pixels of the first image;
      warping the first image to a perspective of the camera mounted at the second location on the vehicle to arrive at a warped first image;
      projecting the warped first image onto the second image; and
      determining a loss in the predicted depth values based on the projection.

10. The system of claim 9, wherein the operations further comprise:
    updating the predicted depth values for the first image based on the loss; and
    reiterating the warping of the first image, projecting the warped first image, and determining a loss using the updated predicted depth values for the first image.

11. The system of claim 9, wherein projecting is performed using a neural camera model to model intrinsic parameters of the camera.

12. The system of claim 9, wherein the operations further comprise:
    predicting a transformation from the first location to the second location based on loss calculations between the warped first image and the second image.

13. The system of claim 9, wherein the second image is an image captured at a time, t+/−1, different from a time, t, at which the first image is captured.

14. The system of claim 13, wherein a transformation from the first location to the second location includes movement of the vehicle between times t and t+/−1.

15. The system of claim 9, wherein projecting the warped first image onto the second image comprises lifting 2D points of the warped first image to 3D points, determining a transformation between the first and second locations and using the transformation to project the 3D points onto the second image in 2D.

16. The system of claim 15, wherein the transformation comprises a distance in three dimensions between image sensors of the first and second locations.

17. A system for self-supervised learning depth estimation, the system comprising:
  a camera configured to capture images of an environment surrounding a vehicle; wherein the camera is mounted at a first location to capture a first image comprising pixels representing a first scene of the environment of the vehicle; and the camera is mounted at a second location to capture a second image comprising pixels representing a second scene of the environment of the vehicle;
  a depth encoder configured to receive the first image and to predict a depth map for the first image, the depth map comprising predicted depth values for pixels of the first image;
  a warping module to warp the first image to a perspective of the camera mounted at the second location on the vehicle to arrive at a warped first image;
  a projection module to project the warped first image onto the second image; and
  a loss module to determine a loss based on the projection.

18. The system of claim 17, further comprising:
  a neural camera model configured to model intrinsic parameters of the camera.

19. The system of claim 17, wherein the second image is an image captured at a time, t+/−1, different from a time, t, at which the first image is captured.

20. The system of claim 19, wherein a transformation from the first location to the second location includes movement of the vehicle between times t and t+/−1.

* * * * *